(12) United States Patent
Fiennes et al.

(10) Patent No.: US 8,182,139 B2
(45) Date of Patent: May 22, 2012

(54) CALIBRATION OF TEMPERATURE SENSING CIRCUITRY IN AN ELECTRONIC DEVICE

(75) Inventors: Hugo Fiennes, Palo Alto, CA (US); Keith Alan Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 899 days.

(21) Appl. No.: 12/130,650

(22) Filed: May 30, 2008

(65) Prior Publication Data
US 2009/0296769 A1 Dec. 3, 2009

(51) Int. Cl.
*G01K 15/00* (2006.01)
*G01K 7/16* (2006.01)

(52) U.S. Cl. ............ 374/1; 374/185; 374/170; 702/130; 702/99

(58) Field of Classification Search .................. 374/100, 374/1, 163, 183, 185, 170–173; 702/130–136, 702/99; 327/512–513
See application file for complete search history.

(56) References Cited

U.S. PATENT DOCUMENTS

| | | | | |
|---|---|---|---|---|
| 4,041,382 A * | 8/1977 | Washburn | ...................... | 324/601 |
| 4,122,719 A * | 10/1978 | Carlson et al. | ................. | 374/167 |
| 4,209,837 A * | 6/1980 | Brown | ............................ | 700/14 |
| 4,210,024 A * | 7/1980 | Ishiwatari et al. | ............ | 374/183 |
| 5,116,136 A * | 5/1992 | Newman et al. | .............. | 374/102 |
| 5,361,637 A * | 11/1994 | Judd et al. | ......................... | 73/766 |
| 6,033,109 A * | 3/2000 | Huang | ............................. | 374/183 |
| 6,146,015 A * | 11/2000 | Weiss | .............................. | 374/164 |
| 6,242,974 B1 * | 6/2001 | Kunst | ................................. | 330/9 |
| 6,309,099 B1 * | 10/2001 | Chang | ............................ | 374/183 |
| 6,612,737 B1 * | 9/2003 | Lobban | .......................... | 374/183 |
| 6,889,152 B2 * | 5/2005 | More | ............................... | 702/99 |
| 7,029,171 B2 * | 4/2006 | Tesi et al. | .......................... | 374/1 |
| 7,052,180 B2 * | 5/2006 | Shih | ................................. | 374/178 |
| 7,260,007 B2 * | 8/2007 | Jain et al. | ........................ | 365/212 |
| 7,474,230 B2 * | 1/2009 | Blom et al. | .............. | 340/870.04 |
| 7,497,615 B2 * | 3/2009 | Kim et al. | ........................ | 374/170 |
| 7,607,823 B2 * | 10/2009 | Kent | ................................. | 374/4 |
| 7,825,767 B2 * | 11/2010 | Tsai | ................................. | 338/20 |
| 2004/0125856 A1 * | 7/2004 | Sprock et al. | .................. | 374/183 |
| 2004/0125857 A1 * | 7/2004 | Sprock et al. | .................. | 374/185 |
| 2009/0002122 A1 * | 1/2009 | Tsai | ............................ | 338/22 R |
| 2009/0122834 A1 * | 5/2009 | Wang | ............................ | 374/185 |
| 2009/0141770 A1 * | 6/2009 | Chen et al. | ..................... | 374/170 |
| 2010/0020842 A1 * | 1/2010 | Riddle et al. | ....................... | 374/1 |

* cited by examiner

*Primary Examiner* — Gail Verbitsky
(74) *Attorney, Agent, or Firm* — Blakely, Sokoloff, Taylor & Zafman LLP

(57) ABSTRACT

Temperature sensing circuitry is used for thermal management of an electronic device. The temperature sensing circuitry includes at least one thermistor placed at or near a component of the electronic device. The temperature sensing circuitry also includes a high-precision resistor for calibration purposes. The resistance of the resistor is equivalent to the resistance of the thermistor at a reference temperature. A calibration reading is obtained using a set current that is being passed through the resistor. An error present in the temperature sensing circuitry is determined based on the calibration reading and a design value. A temperature measurement associated with the component is then made using the thermistor, while the set current is being passed through the thermistor. The error is corrected in the temperature measurement of the component. Other embodiments are also described.

14 Claims, 4 Drawing Sheets

CALIBRATION OF TEMPERATURE SENSING CIRCUITRY IN AN ELECTRONIC DEVICE

TECHNICAL FIELD

An embodiment of the invention relates generally to thermal management, and more particularly, to a temperature sensing system in a portable electronic device. Other embodiments are also described.

BACKGROUND

Portable electronic devices are becoming increasingly popular. Examples of portable electronic devices include laptop computers, personal digital assistants (PDAs), mobile telephones, media players, and hybrid devices that provide a combination of the functionalities of the above devices.

To satisfy consumer demand for small and lightweight portable electronic devices, manufacturers are continually striving to reduce the size of the devices while providing enhanced functionality. When electronic components are tightly packaged in a small device, heat dissipation becomes an important issue. As most consumer electronics cannot function properly at a high temperature for an extended period of time, manufacturers often place temperature sensors, such as thermistors, to monitor the internal temperature of the electronic devices. These temperature sensors allow out of range temperature scenarios to be recognized, so that mitigation actions can be taken before system failure.

Conventionally, temperature sensors in a device are calibrated to ensure their accuracy, by heating up the device to a known temperature. The output of the temperature sensors is then compared with an expected temperature to determine an error in the sensor output. This error is then stored in the device for later use. Thereafter, the device, while being used "in the field", then automatically compensates the readings from its sensors using the stored error values. However, the conventional calibration process requires heating up the motherboard of a device in an oven, which is a complex process in terms of time and resources. Further, the conventional calibration process cannot be performed in the field, i.e. after the devices have been packaged and shipped by its manufacturer for resale.

SUMMARY

Temperature sensing circuitry is used for thermal management of an electronic device. As modern electronic devices often operate near hot limits to maximize performance, the temperature measurements taken using the sensing circuitry in every manufactured device should be accurate, to ensure that the hot limit is never exceeded and that the performance of the device is not unduly lowered. Reliable and low cost calibration of the temperature sensing circuitry is thus needed.

In one aspect of the invention, the temperature sensing circuitry includes at least one thermistor placed at or near a component of the electronic device. The temperature sensing circuitry also includes a high-precision resistor for calibration purposes. The resistance of the resistor is equivalent to the resistance of the thermistor at a reference temperature. A calibration reading is obtained using a set current that is being passed through the resistor. An error present in the temperature sensing circuitry is determined, based on the calibration reading and its design value. A temperature measurement associated with the component is then made using the thermistor, while the set current is being passed through the thermistor. The determined error is applied to correct the temperature measurement of the component. Other embodiments of the invention are also described below.

Embodiments of the present invention include apparatuses and data processing systems which perform these methods, and computer readable media which when executed by data processing systems cause the systems to perform these methods.

Other features of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

An electronic computing device typically generates heat in operation. After a period of operation, the temperature of the device may rise to a level that causes damage to its internal electronics—a so-called hot limit. To prevent heat damage, power settings of one or more of the device components can be dynamically adjusted based on the temperature of the components. The adjustment in power settings reduces power consumption, which, in turn, reduces the temperature of the device.

In one embodiment, the electronic computing device includes a temperature sensing subsystem to monitor the temperatures of its components. These components may be a heating generating component, a component sensitive to high temperature, a component near a heat source, a component distant from the main heat generating components, or other components that are good indicators of internal, external, or ambient temperatures of the device.

In one embodiment of the present invention, it is recognized that a temperature sensing subsystem can be calibrated with a high-precision resistor. The resistor is chosen to have the equivalent resistance of a thermistor at a reference temperature that is below the upper temperature limit of the system. In one embodiment, the reference temperature can be chosen to be in the proximity of the desired operating temperature of the system, which is near the hot limit.

Figure 1:
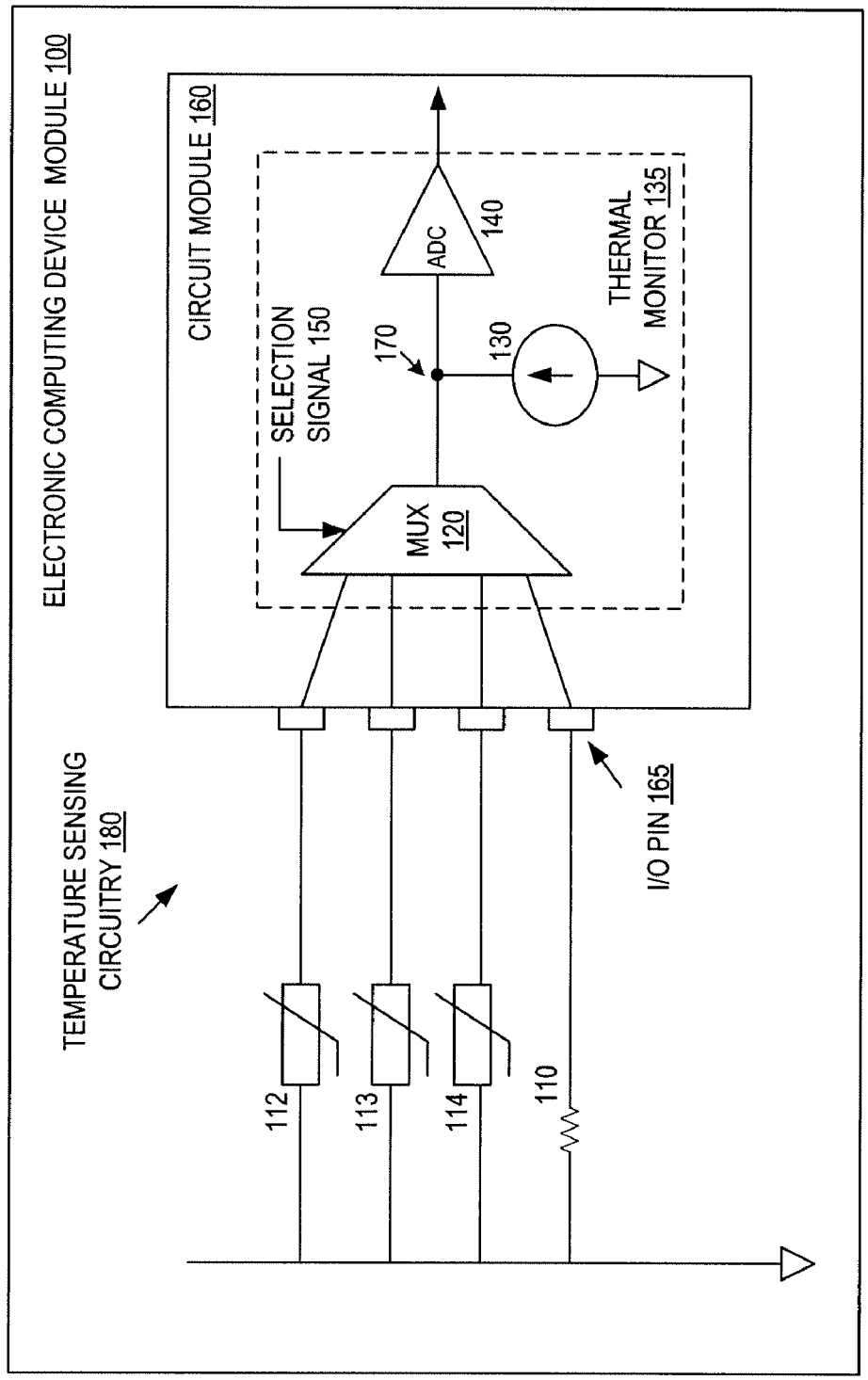
FIG. 1 is a diagram of illustrative temperature sensing circuitry in accordance with an embodiment of the present invention.

FIG. 1 is a simplified block diagram of an embodiment of temperature sensing circuitry 180 deployed within an electronic computing device 100. Temperature sensing circuitry 180 includes one or more thermistors 112-114 and a resistor 110, all of which are coupled to a thermal monitor 135 via a plurality of I/O pins 165. In one embodiment, thermal monitor 135 may be part of a single-chip circuit module 160, such as a cellular baseband processor integrated circuit package, in a wireless communication device. Resistor 100 is external to the integrated circuit package, and may be coupled to an unused thermistor input pin of the integrated circuit package. For simplicity of illustration, resistor 110 is shown as located next to thermistors 112-114. However, resistor 110 may be located anywhere in device 100, and may not be located next to or near thermistors 112-114.

Thermal monitor 135 includes a multiplexer 120, the output of which is coupled to a current source 130 and an analog to digital converter (ADC) 140. Current source 130 supplies a set current to drive a resistive load in the temperature sensing circuitry 180, thereby providing a voltage at the output of multiplexer 120 (i.e., at a point 170). ADC 140 converts the voltage at point 170 into a digital measurement. Electronic computing device 100 uses the digital measurements to monitor the temperatures of its components, such that power consumption may be dynamically adjusted, thereby preventing damage to the electronics caused by excessive heat.

In one embodiment, each of the thermistors 112-114 is placed near or at a component of electronic computing device 100 to measure the temperature of the component. In an embodiment where electronic computing device 100 is a handheld wireless communication device, the components for which the temperatures are measured may include a battery, a RF transmitter power amplifier, a subscriber identity module (SIM) card circuit, and other electronic modules. The SIM card circuit in a handheld device is generally located away from the main heat generating components; therefore, the temperature reading at the SIM card circuit provides a thermal reading that is distant from the main heat generating components and can be used to monitor the ambient temperature of the device. Temperatures may also be monitored at or near non-electrical parts of the system for user satisfaction (e.g., to prevent a handheld device from overheating to cause user discomfort). The non-electrical parts may include the portion of the housing at the earpiece (receiver), and the center of the housing's back panel.

Figure 2:
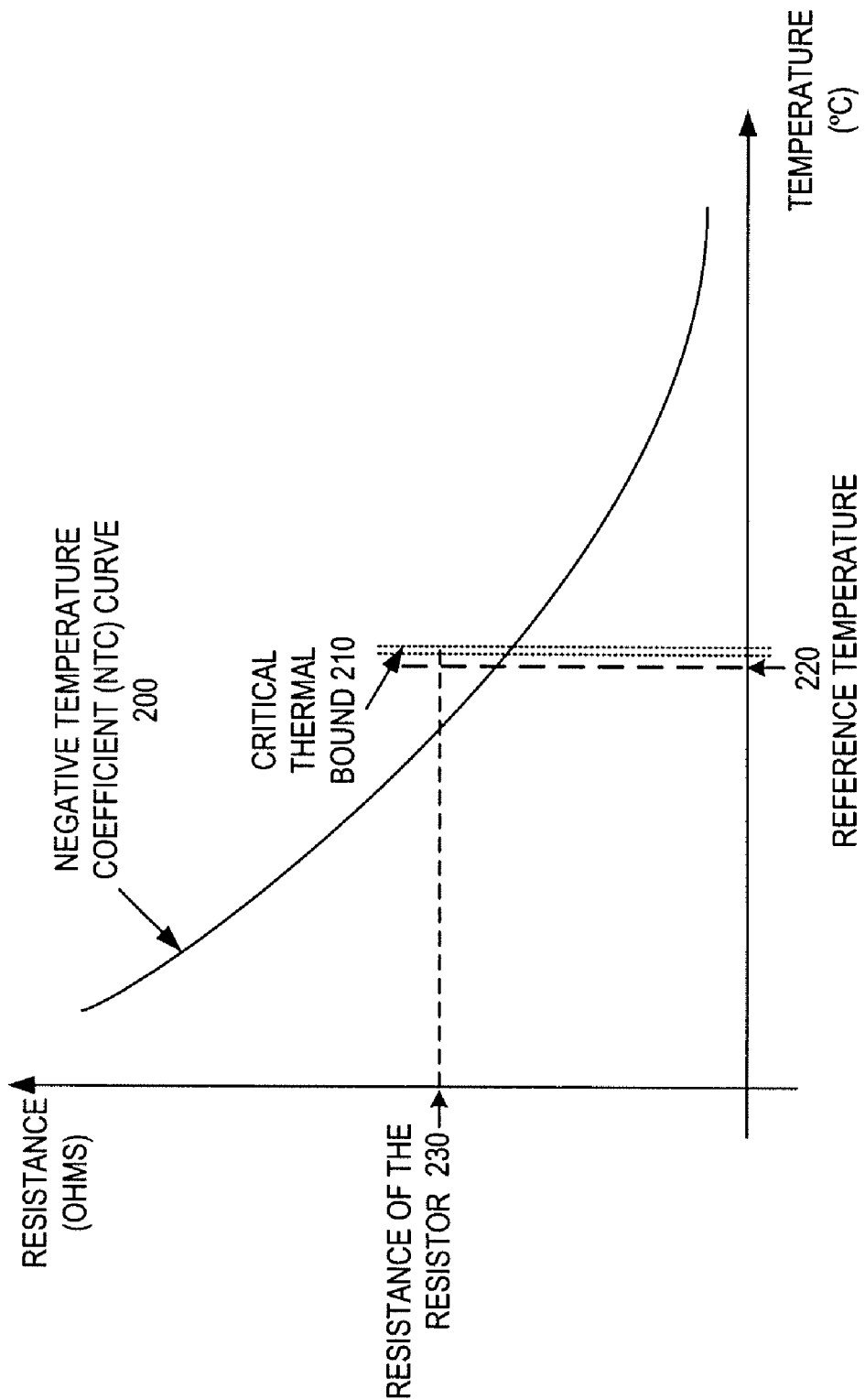
FIG. 2 is a diagram of an illustrative temperature coefficient curve of a thermistor used in the temperature sensing circuitry in accordance with an embodiment of the present invention.

FIG. 2 illustrates the temperature-resistance curve 200 of an example thermistor 112-114. Temperature-resistance curve 200 is also referred to as a negative temperature coefficient (NTC) curve, as the resistance drops when the temperature increases. In one embodiment, a critical thermal bound 210 of electronic computing device 100 is the upper bound of temperatures for which the operation of device 100 is optimized. Critical thermal bound 210 is near but below a hot limit of the device. For example, critical thermal bound 210 may be determined based on the safety limit of the battery in device 100, a customer satisfaction limit, and other factors. Device 100 may operate below critical thermal bound 210 with little or no performance impact caused by the thermal management. When the temperature of device 100 rises to a point where it is likely to exceed critical thermal bound 210, thermal mitigation actions may be initiated to reduce the power consumption of device 100. Thus, the critical thermal bound 210 may be a relatively narrow range of temperatures, e.g. at about 60 degrees +/− less than 2 degrees.

A reference temperature 220 is chosen near or in critical thermal bound 210. Reference temperature 220 can be used to select the resistance of resistor 110. In one embodiment, the resistance of resistor 110 is chosen such that it is equivalent to the resistance of thermistors 112-114 at reference temperature 220. Thus, the point representing the resistance of resistor 110 and reference temperature 200 falls on the temperature-resistance curve. Resistor 110 is a precision resistor that for example may be accurate to within approximately 0.1% or better. That is, the actual resistance of resistor 110 may be guaranteed by its manufacturer to be within approximately 0.1% of the design (or theoretical) resistance value, or better. In comparison, thermistors 112-114 may be substantially less accurate, e.g., accurate within approximately 1% of the design value. In one embodiment, the precision resistor has an accuracy or tolerance at least an order of magnitude (factor of 10) better than that of the thermistors 112-114.

Referring again to FIG. 1, during operation of temperature sensing circuitry 180, multiplexer 120 selects one of resistor 110 and thermistors 112-114 according to a selection signal 150. Selection signal 150 may be generated by a user command, a software-generated command, or circuitry that resides within or outside of circuit module 160. When one of the thermistors 112-114 is selected, multiplexer 120 establishes a current path from the selected thermistor to ADC 140. The current supplied by current source 130 passes through multiplexer 120 and the selected thermistor to establish a voltage at the input of ADC 140, which is converted to a digital measurement by ADC 140. The digital measurement can be converted to a temperature according to a predetermined conversion table or a conversion formula.

However, the digital measurement may deviate from the true temperature value in device 100 due to the inaccuracy in thermistors 112-114, current source 130, ADC 140, as well as any other components in the measurement path. For example, thermistors 112-114 may each have about 1% of inaccuracy. Additionally, current source 130 and ADC 140 may each have about 2% of inaccuracy. The inaccuracy of these circuit elements may accumulate to produce a temperature measurement that is below or above the true temperature value, by in this example 5%. In many instances, this may be too large a margin, because many specimens of the device 100 will, as a result, be operating less efficiently in the field. To explain, consider the following example.

With +/−5% total inaccuracy, the thermal management system may have a "programmed hot limit" that is 5% less than the actual hot limit. This helps ensure that every manufactured device will be in compliance of the actual hot limit, despite some devices reading low and others high. Now, while the low devices may indicate the temperature to be as low as 55 degrees, the high devices will indicate as high as 65 degrees, even when the actual temperature is 60 degrees. But due to the inaccuracy, the thermal management system running in the high devices may have to reduce performance when the actual temperature is only about 50 degrees, almost a full ten degrees below the actual limit. As a result, consumers who have by chance been given high devices may be experiencing noticeably lower performance levels than others who have low devices. Calibration may help reduce the total inaccuracy of the temperature sensing capability.

To calibrate the circuit elements in temperature sensing circuitry 180, multiplier 120 selects resistor 110 to establish a path between resistor 110 and ADC 140. The set current supplied by current source 130 flows through resistor 110 to provide a voltage at the input of ADC 140. In one embodiment, resistor 110 has a resistance that is the equivalent to the resistance of thermistors 112-114 at the reference temperature, e.g., between about 55 to 60 degrees centigrade, depending on the type of electronics used in the electronic computing device 100.

When resistor 110 is used, the digital measurement at the output of ADC 140 includes an error present in resistor 110, current source 130 and ADC 140. As current source 130 and ADC 140 are far less accurate than resistor 110, the inaccuracy of resistor 110 may be negligible in the resulting digital measurement. For example, if resistor 110 has the same resistance as a thermistor 112-114 at 60 degrees centigrade, the ADC output per manufacturer or design specification may be, illustratively, 1000 (before conversion into a temperature). However, due to the errors introduced by current source 130 and ADC 140, the actual digital measurement may be, illustratively, 980. The 20 units of difference can be used to calibrate temperature sensing circuitry 180 in order to remove the errors introduced by current source 130 and ADC 140. A process for calibrating temperature sensing circuitry 180 is described in greater detail with reference to FIG. 3 below.

Figure 3:
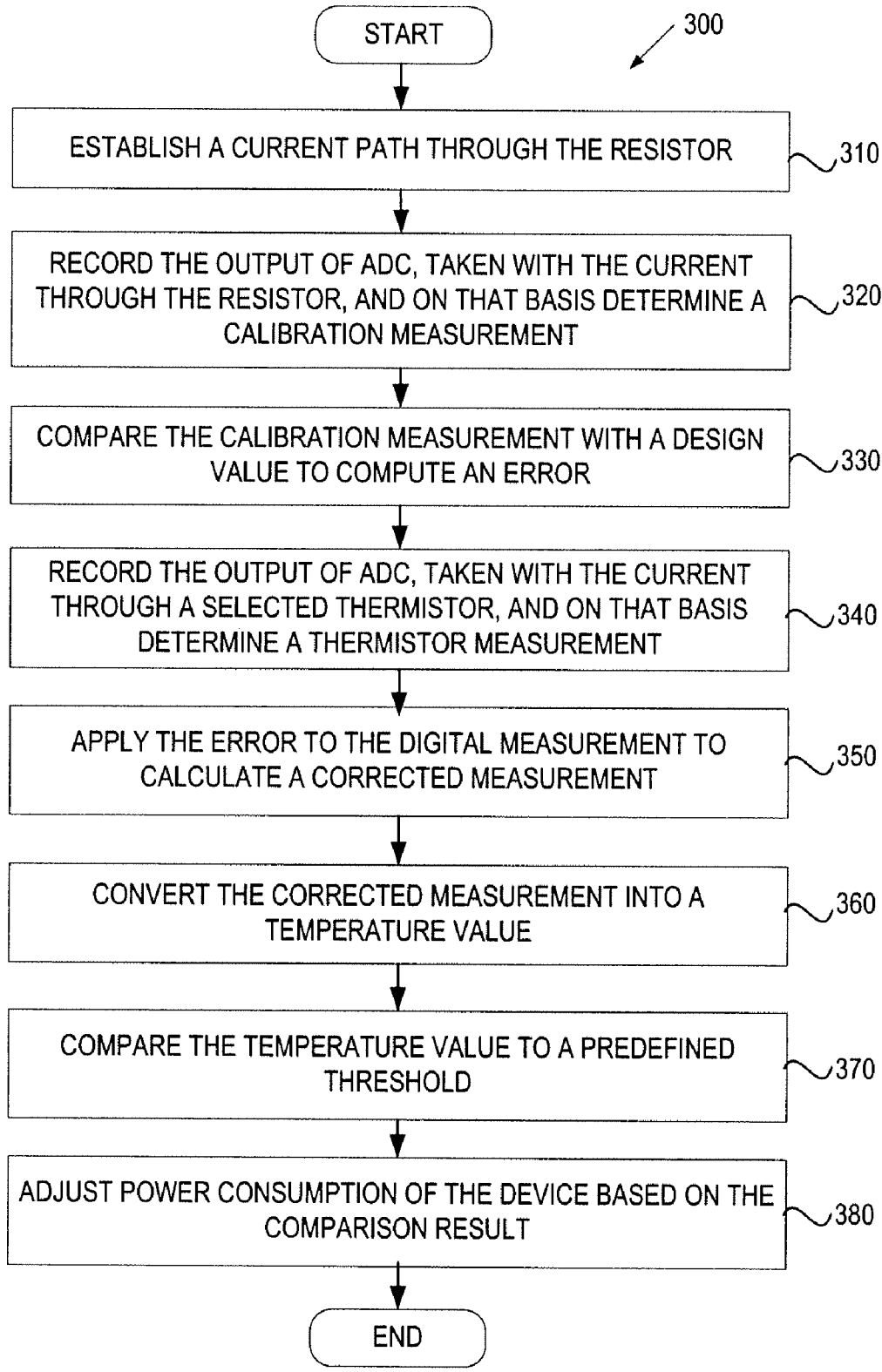
FIG. 3 is flow diagram of an illustrative process for calibrating the temperature sensing circuitry in accordance with an embodiment of the present invention.

FIG. 3 is a flow diagram of an embodiment of a process 300 for calibrating temperature sensing circuitry 180 of FIG. 1. Process 300 may be implemented with software, firmware, and/or hardware in electronic computing device 100. In one embodiment, process 300 may be executed by circuit module 160 of FIG. 1, a processor of electronic computing device 100, or other processing circuits of electronic computing device 100.

Referring to FIG. 3, a calibration baseline is established by using resistor 110 of FIG. 1. At block 310, in response to selection signal 150, multiplexer 120 establishes a current path through the resistor 110. At block 320, the output of ADC 140 is recorded in local storage as a calibration measurement. At block 330, the calibration measurement is compared with a design value to compute an error. The design value is based on the manufacture or design specification of ADC 140, current source 130, and resistor 110. At block 340, a thermistor measurement is taken (using the ADC 140) by selecting one of thermistors 112-114 and establishing the same current through the selected thermistor. At block 350, the error is applied to the thermistor measurement to calculate a corrected measurement. At block 360, the corrected measurement is converted into a temperature value using a conversion table or a conversion formula. The temperature value indicates the temperature of the component associated with the selected thermistor. As an alternative, the conversion of the thermistor measurement to the temperature value can be performed before applying the computed error to obtain the corrected measurement. That is, the conversion operation of block 360 may be performed on the error at block 330 and on the thermistor measurement at block 340. The converted error can then be applied to the converted thermistor measurement to obtain a corrected temperature value.

The temperature value may be further processed by software run by circuit module 160 or other software/hardware modules in electronic computing device 100. At block 370, the temperature value is compared to a predefined threshold temperature. Based on the comparison result, at block 380, power consumption of electronic computing device 100 may be increased or decreased to adjust the temperature in device 100. In one embodiment, power consumption may be managed by a separate circuit module in device 100, such as a power management unit. An embodiment of a power management unit will be described with reference to FIG. 4.

A feature of process 300 is that it can be performed at any time of the lifecycle of the electronic computing device 100, for as many times as necessary. The calibration measurement using resistor 110 may be read every time the temperatures of device components are measured. Process 300 does not involve heating up device 100 in an oven, which is a complex process in terms of time and resources.

In one embodiment, the electronic computing device 100 of FIG. 1 may be a portable electronic device, as that is where the benefits of the invention will be most apparent. However, the invention could if desired be implemented in a desktop personal computer, for instance. The portable electronic device may be a laptop computer, a handheld electronic device (such as a personal digital assistant or a handheld gaming device), a media player, or a wearable electronic device. Examples of wearable electronic devices include wrist-watch devices, pendant devices, headphone and earpiece devices, and other wearable and miniature devices. In some embodiments, the portable electronic device may be provided with wireless communication capability, such as cellular telephones, cordless telephones, remote controllers and global positioning system (GPS) devices. The wireless electronic devices may be hybrid portable electronic devices that combine the functionality of multiple conventional devices. Examples of hybrid portable electronic devices include a cellular telephone that includes media player functionality, a gaming device that includes wireless communications capability, a cellular telephone that includes game and email functions, and a portable device that receives email, supports mobile telephone calls, has music player functionality and supports web browsing. These are merely illustrative examples.

In one embodiment, the portable electronic device may include circuitry to run software applications, such as internet browsing applications, voice-over-internet-protocol (VOIP) telephone call applications, email applications, media playback applications, operating system functions, etc. The portable electronic device may also be used to implement communications protocols, such as Internet protocols, wireless local area network protocols (e.g., IEEE 802.11 protocols, also known as Wi-Fi®), protocols for other short-range wireless communications links such as the Bluetooth® protocol, protocols for handling 3G communications services, 2G cellular telephone communications protocols, etc. The term "2G communications" herein refers to traditional cellular telephone and data communications. An example of 2G cellular telephone systems are those based on Global System for Mobile Communication (GSM) systems. The term "3G communications" herein refers to communications with newer formats that support increased speeds and may be used for both data and voice traffic. Such formats may use wide band code-division multiple access (CDMA) technology. In some embodiments, wireless signals can also be sent using light (e.g., using infrared communications).

Figure 4:
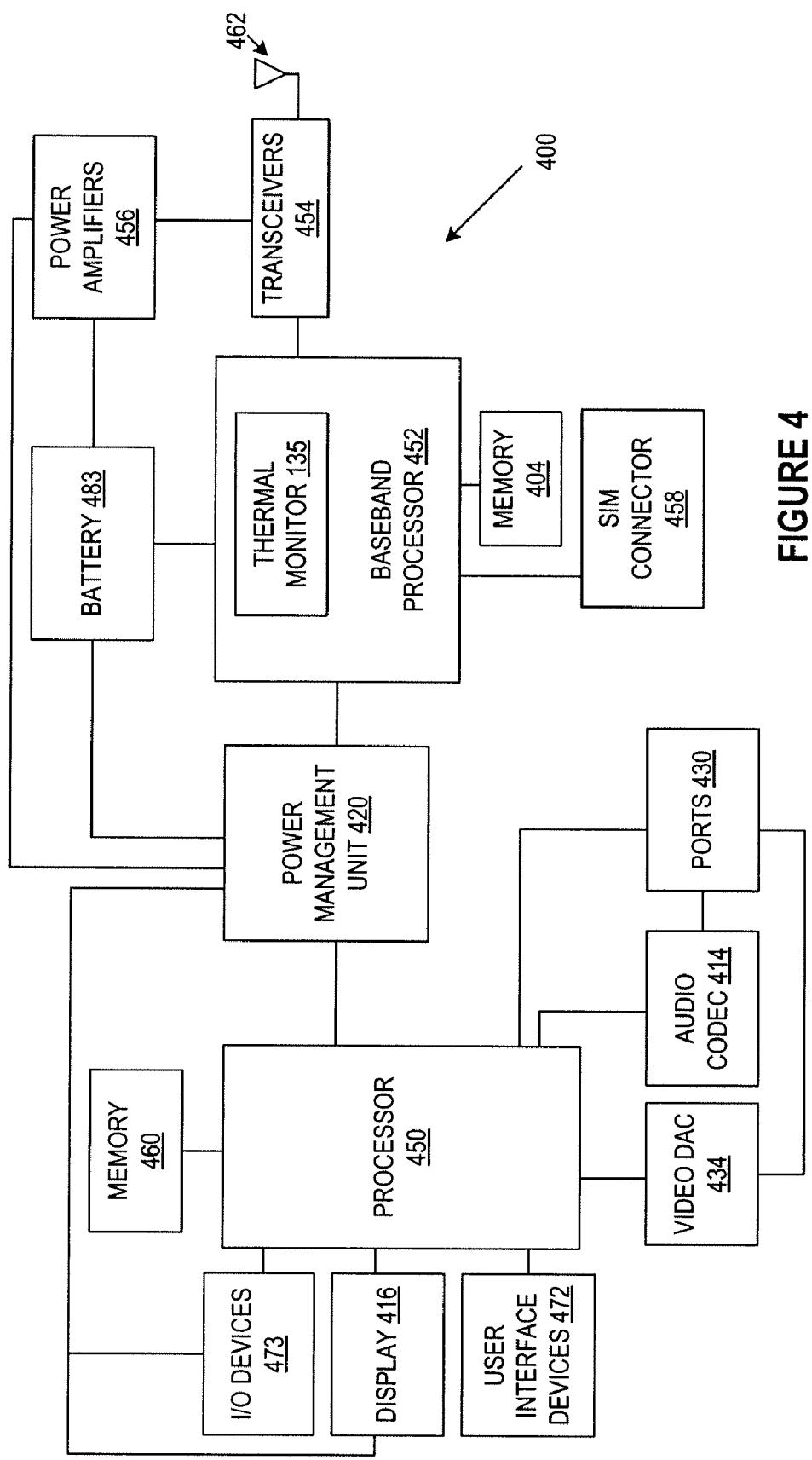
FIG. 4 is a circuit diagram of an illustrative wireless electronic device in accordance with an embodiment of the present invention.

In accordance with an embodiment of the present invention, an illustrative portable electronic device 400 with wireless communications capability is shown in FIG. 4. It is understood that for clarity of the description, components of portable electronic device 400 that are not germane to this disclosure are not described.

As shown in FIG. 4, portable electronic device 400 includes a processor 450, which serves as the main processor for implementing user functions. In this capacity, processor 450 may be used to run applications for the user such as media playback applications, communications applications, calendar applications, games, notepad applications, business applications, etc.

The operations of processor 450 may be supported using a memory 460 that comprises one or more memory modules.

Memory 460 may include a relatively small memory module (e.g., 8 Mbytes) that is used to store boot instructions. Memory 460 may also include a larger memory module (e.g., 4-16 Gbytes) that is used to store applications and data, and a static Random Access Memory (RAM) for fast memory operations. Memory 460 may include nonvolatile and volatile memory modules.

Device 400 also includes a baseband processor 452 to provide data processing function for the data received and the data to be transmitted. Baseband processor 452 may receive data from processor 450, audio data from an audio codec 414, GPS data from an antenna 462, or other sources.

Baseband processor 452 may, if desired, be implemented as a single integrated circuit. Baseband processor 452 may provide data to be transmitted to transceiver 454 (e.g., radio frequency (RF) transceiver circuitry that can handle 2G operations and that can handle 3G operations using wide band code division multiple access techniques). Baseband processor 52 may be coupled to power amplifier circuitry 456 (e.g., 2G GSM power amplifier circuit and 3G power amplifier circuitry). Memory 404 may be used to store data for baseband processor 452. Memory 404 may be, for example, 8-16 MB of static random-access memory (SRAM).

Baseband processor 452 may include processing circuitry for handling audio signals. For example, baseband processor 452 may include a digital signal processor (DSP) block that performs functions such as noise suppression, gain control, filtering, analog-to-digital conversion, digital-to-analog conversion, and vocoding (e.g., functions such as compressing audio to phase-code-modulation-encoded signals for transmission over a wireless network, voice decoding functions, etc.).

Audio codec 414 may reside on a separate chip to handle telephony audio signals and other audio signals. For example, speakers and a microphone may be coupled to audio codec 414.

Device 400 includes an antenna 462, which may further include a pentaband cellular antenna and a dual band antenna. Illustratively, the pentaband antenna may be used to cover wireless bands at 850 MHz, 900 MHz, 1800 MHz, 1900 MHz, and 2100 MHz, and the dual band antenna may be used to handle 1575 MHz signals for GPS operations, 2.4 GHz signals for Bluetooth® operations, and 2.4 and 5.0 GHz for IEEE 802.11 operations and wireless local area network (WLAN) operations.

Device 400 may be powered by a battery 483. During data transmission, power amplifier circuitry 456 may boost the output power of transmitted signals to a sufficiently high level to ensure adequate signal transmission. Battery 483 may be a lithium ion battery, a lithium polymer battery, or a battery of any other suitable type. Battery 483 may be rechargeable and may be removed by an end user as necessary (e.g., when it is desired to replace a fresh battery).

Device 400 may include a subscriber identity module (SIM) connector 458 and other ports 430. SIM connector 458 may be used to receive a SIM card for authorizing cellular telephone services. When the SIM card is installed in device 400, an authorized user may use device 400 for voice and data wireless communications (e.g., using the 3G or 2G capabilities of devices 400).

Ports 430 may include power jacks to recharge battery 483 from a direct current (DC) power supply. Ports 430 may also include data ports to exchange data with external components such as a personal computer or peripheral, audio-visual jacks to drive a headphone, a microphone, a speaker, a monitor, or other external audio-video equipment, a memory card slot, etc. Digital video output signals from processor 450 may be supplied to video digital-to-analog converter (DAC) circuit 434. The resulting analog video signals may be supplied to ports 430.

The functions of some or all of these components and the internal circuitry of device 400 can be controlled using an interface device such as a touch screen display.

A display 416 of the device 400 may be a liquid crystal diode (LCD) display, an organic light emitting diode (OLED) display, or any other suitable display. The outermost surface of display 416 may be formed from one or more plastic or glass layers. If desired, touch screen functionality may be integrated into display 416 or may be provided using a separate touch pad device.

Device 400 may have other user interface devices 472, such as buttons (e.g., alphanumeric keys, power on-off, power-on, power-off, and other specialized buttons, etc.), touch pads, key pads, keyboards, pointing sticks, click wheels, scrolling wheels, or other cursor control device, a microphone for supplying voice commands, a camera, or any other suitable interface for controlling device 400. If desired, device 400 can be controlled remotely (e.g., using an infrared remote control, a radio-frequency remote control such as a Bluetooth® remote control, etc.).

Device 400 may include other I/O devices 473, such as light-emitting diodes (LEDs) to visually display the status of device 400, speakers to generate sounds, a vibrator to generate vibration during silent operations, etc.

In the embodiment shown in FIG. 4, thermal monitor 135 of temperature sensing circuitry 180 (FIG. 1) resides in baseband processor 452. For simplicity of the circuit diagram, thermistors 112-114 and resistor 110 are not shown in FIG. 4. Thermistors 112-114 may be placed near or at battery 483, power amplifiers 456, SIM connector 458, or other components of device 400. Resistor 110 may be located near baseband processor 452 or other convenient locations within device 400. Thermal monitor 135 receives input signals from thermistors 112-114 and resistor 110, and generates calibration measurements and temperature measurements. The temperature measurements, after calibration, may be used to manage the power consumption of device 400.

To minimize power consumption, device 400 may include a power management unit 420 to implement power management functions. In response to the temperature measurement of thermistors 112-114 and thermal monitor 135, power management unit 420 may adjust the power consumption by the components of device 400, thereby maintaining the temperature of device 400 at or just below a critical thermal bound. Power management unit 420 reduces the power consumption to reduce heat generation when the temperature measurement exceeds the critical thermal bound threshold. When the temperature measurement drops below the threshold, power management unit 420 may increase the power supplied to that component and other components to improve performance. For example, power management unit 420 may adjust the gain settings of power amplifiers 456, the voltages supplied by battery 483, the backlight of display 416 or other visual output devices 473, the voice/ data transmission rate and/or the processing speed of baseline processor 452, as well as other functions of the device components.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for thermal management in an electronic device, comprising:
   obtaining a calibration reading using a set current that is being passed through a resistor in a temperature sensing circuit, wherein the temperature sensing circuit includes a thermistor which is placed at or near a component of the electronic device and the resistance of the resistor is equivalent to the resistance of the thermistor at a reference temperature;
   determining an error present in the temperature sensing circuit based on the calibration reading and a design value; and
   correcting for the error in a temperature measurement associated with the component, wherein the measurement is made using the thermistor while the set current is being passed through the thermistor.

2. The method of claim 1, wherein determining an error present in the temperature sensing circuit further comprises:
   determining error in an analog-to-digital converter (ADC) and a current generator in the temperature sensing circuit, wherein the current generator provides the set current.

3. The method of claim 1, wherein the design value is based on a manufacture or design specification of an ADC, a current source, and the resistor in the temperature sensing circuit.

4. The method of claim 1, wherein the resistor is more accurate than the thermistor.

5. The method of claim 1, wherein the resistor is accurate to within +/−0.1% or better, and the thermistor is accurate to within +/−1% or better.

6. An apparatus for thermal management in an electronic device, the apparatus comprising:
   means for providing a set current;
   means for alternately passing the set current through a resistor and a thermistor wherein the resistance of the resistor equivalent to the resistance of the thermistor at a reference temperature;
   means for obtaining a digital calibration reading while the set current is being passed through the resistor;
   means for obtaining digital thermistor reading while the set current is being passed through the thermistor;
   means for computing an error based on the digital calibration reading and a design value; and
   means for providing a corrected temperature measurement, based on the computed error and the digital thermistor reading.

7. An apparatus for thermal management in an electronic device, comprising:
   a current generator to provide a set current;
   a multiplexer having an input coupled to receive the set current;
   a thermistor coupled to an output of the multiplexer;
   a resistor coupled to another output of the multiplexer, the resistor having a resistance that is equivalent to a resistance of the thermistor at a reference temperature;
   an analog-to-digital converter (ADC) coupled to the input of the multiplexer, to obtain a digital thermistor voltage using the thermistor while the set current is being passed through the thermistor and a digital calibration reading using the resistor while the set current is being passed through the resistor;
   a processing circuit to receive the thermistor voltage and the calibration reading, compute an error based on the calibration reading and a design value, and correct a temperature measurement based on the error and the thermistor voltage.

8. The apparatus of claim 7, wherein the processing circuit is to correct a temperature measurement by converting a corrected voltage measurement into a temperature value.

9. The apparatus of claim 7, wherein the design value is based on a manufacture or design specification of the ADC, the current generator, and the resistor.

10. The apparatus of claim 7, wherein the resistor is more accurate than the thermistor.

11. A method for thermal management in an electronic device, comprising:
    obtaining a digitized resistor voltage while a set current provided by a current source is being passed through a resistor in a temperature sensing circuit, wherein the temperature sensing circuit includes a thermistor which is placed at or near a component of the electronic device and the resistance of the resistor is equivalent to the resistance of the thermistor at a reference temperature;
    computing an error present in the temperature sensing circuit based on the digitized resistor voltage and a design value;
    obtaining a digitized thermistor voltage while the set current provided by the current source is being passed through the thermistor; and
    correcting a temperature measurement associated the component, based on the computed error and the digitized thermistor voltage.

12. The method of claim 11, wherein correcting comprises converting a corrected voltage measurement into a temperature value.

13. The method of claim 11, wherein the design value is based on a manufacture or design specification of an ADC that was used for obtaining the digitized resistor and thermistor voltages, the current source, and the resistor in the temperature sensing circuit.

14. The method of claim 11, wherein the resistor is more accurate than the thermistor.

* * * * *